United States Patent
Lauder (10) Patent No.: US 9,247,401 B2
(45) Date of Patent: Jan. 26, 2016

(54) SIGNATURE CONTROL FOR SMS

(71) Applicant: Gary M. Lauder, Atherton, CA (US)

(72) Inventor: Gary M. Lauder, Atherton, CA (US)

(73) Assignee: MediaFriends, Inc., Cambridge, MA (US)

( * ) Notice: Subject to any disclaimer, the term of this patent is extended or adjusted under 35 U.S.C. 154(b) by 0 days.

(21) Appl. No.: 14/182,596

(22) Filed: Feb. 18, 2014

(65) Prior Publication Data

US 2015/0237486 A1 Aug. 20, 2015

(51) Int. Cl.
*H04W 4/00* (2009.01)
*H04W 4/14* (2009.01)
*H04L 12/58* (2006.01)
*H04L 29/08* (2006.01)
*H04M 1/725* (2006.01)

(52) U.S. Cl.
CPC ............... *H04W 4/14* (2013.01); *H04L 51/043* (2013.01); *H04L 67/306* (2013.01); *H04M 1/72552* (2013.01)

(58) Field of Classification Search
CPC . H04L 9/3247; H04L 51/066; H04L 12/5835; H04L 63/123; H04L 2209/60; H04L 51/16; H04L 63/0407; H04L 63/12; H04L 9/0877; H04L 12/5855; H04L 12/5885; H04L 51/14; H04L 63/061; H04L 67/02
USPC .......................................................... 455/466
See application file for complete search history.

(56) References Cited

U.S. PATENT DOCUMENTS

| | | | | |
|---|---|---|---|---|
| 6,718,178 | B1 * | 4/2004 | Sladek et al. | 455/466 |
| 8,989,713 | B2 * | 3/2015 | Doulton | H04L 12/5835 455/413 |
| 2003/0222909 | A1 * | 12/2003 | Long et al. | 345/752 |
| 2006/0288219 | A1 * | 12/2006 | Adams et al. | 713/176 |
| 2008/0016158 | A1 * | 1/2008 | Bin | 709/206 |

* cited by examiner

*Primary Examiner* — Kwasi Karikari
(74) *Attorney, Agent, or Firm* — Chapin IP Law, LLC (57) ABSTRACT

A social messaging hub provides communication services for a data enabled device having Internet network access capabilities. A user is given a registered phone number and unique IP addressable identification which serve as a source and destination identifier of the associated data enabled device. User signatures can be appended onto SMS messages and using resources on the social messaging hub a user can control when the signatures are appended.

7 Claims, 7 Drawing Sheets

SIGNATURE CONTROL FOR SMS

FIELD OF THE INVENTION

The present invention relates to messaging and communications, and to mobile telephony and text messaging signature control.

BACKGROUND

People around the world are confronted by a number of communications and writing devices which have evolved relatively recently from the separate areas of telephone communications networks, wireless networks, television or cable networks, and computer networks and personal computers. The more recent devices—mobile phones with message/picture/video texting, personal digital devices for Internet browsing and computer-based blogging and social networking sites—have been shaped in part by the separate networks of origin, but the nature and capabilities of many of these now-ubiquitous devices have both converged, and also advanced quickly in different directions as the industries controlling each sector have capitalized on their market power, reservoir of legacy subscribers and, in some cases, regulatory barriers and proprietary network equipment and connection protocols, to introduce new consumer features, often employing developments from other consumer products, and aiming to lure subscribers by mimicking those products. However, in doing so, each industry has also been limited by its own equipment, data transfer speeds and connection abilities.

Thus, as digital imaging advanced and consumers learned to take and handle images and to attach the images to e-mail messages, imaging chipsets were incorporated into mobile telephones and the mobile phones were configured to display images and allow their transmission between phones. Text and message protocols allowed transmission of 'instant' messages, and coded standardized greetings and messages between phone users, filling a niche for immediate portable, personal communication that was not met by existing personal computer devices. Devices like the iPhone®, introduced in 2007 allowed a user to access his Internet-based email from his mobile phone via a specially-configured data connection with his mobile service provider, and to exchange content via wireless connection to his personal computer.

However, despite these developments blurring boundaries between the classical phone, mobile telephone, Internet, wireless and television or cable networks, there has not been a convergence. Rather, although industry and government groups have promoted interface standards for several different classes of data or communication, each industry has retained much of its special structure, and the devices served by an industry (such as mobile telephones) may find their feature set constrained by intrinsic limitations of bandwidth and connectivity, by available networking equipment base, and by the level of contractual cooperation agreements of its provider. The many different classes of communications systems now available, and the many separate provider networks in each class, have also required the development of new supporting entities, such as nationally- or internationally-extending registries, aggregators, exchanges and other entities, in order to affect timely transfer of data, messages and/or entertainment content. This second-level infrastructure imposes further constraints of the feasible, or economically feasible, set of features that a consumer may exercise. Thus, for example, mobile telephones have been augmented with a display and the ability to run small applications such as games, MP3 players, Internet browsers/applications and email retrieval, while personal computers have the capability to run larger programs, employ wireless connectivity and perform voice-over-IP (VOIP) Internet communications. Various special-purpose applications requiring cross-platform connections may be provided, or applications simulating cross-platform capabilities may be developed, by a service provider, such as a television-displayed chat session available for subscribers of a TV provider. However, many other personal devices while having large data capacity, ability to connect to another user device and ability to run entertainment apps, may entirely lack the mobile telephone electronic circuitry necessary for exchanging mobile messages with telephone users. Additionally, the delivery of messages in some social messaging systems is affected by limitations of carrier networks and international boundaries. It is therefore desirable to provide a system for enhanced communication between personal devices while minimizing bandwidth usage.

Conventional systems allow a signature to be appended to a text message, but the only control a user has is binary, that is the user can either turn on or turn off the feature to append the signature. Therefore in many situations, recipients of text messages can be inundated with repeated signatures which reduce the bandwidth for useful information in text message, especially when the messages are from the same sender.

SUMMARY OF THE INVENTION

Methods and systems disclosed herein provide text message signature control with a simple user interface. In one embodiment, a method for controlling signatures appended to Short Message Service/Multimedia Messaging Service/Enhanced Messaging Service (SMS/MMS/EMS) communications includes obtaining a plurality of unique identifiers, assigning to a user of a data enabled device a unique identifier from the plurality of unique identifiers, associating the unique identifier with a data enabled device identifier, registering the unique identifier to data enabled device identifier association in a database, receiving a sender defined signature control criterion. The method further includes maintaining a history of sender-recipient history, determining whether to append the signature onto an SMS message as a function of the sender defined signature control criterion and the sender-recipient history and providing the SMS message to a message service for delivery to a message recipient indicated by the SMS destination identifier.

Such a method, reduces repetitive signatures from being delivered on messages between the same sender/recipient pairs, reduces the amount of unnecessary data transmitted and frees up a percentage of characters within messages (depending on the signature length) for actual message content.

An exemplary social messaging hub for controlling signatures appended to Short Message Service/Multimedia Messaging Service/Enhanced Messaging Service (SMS/MMS/EMS) communications include a hub application operating on a web server, a signature control subsystem coupled to the hub application, a database for storing sender-recipient history and an SMS provider coupled to the signature control subsystem and to a global SMS infrastructure.

Such a system can keep track of senders and recipients and for example can provide a single signature per discussion thread per day. The system can prevent inundating recipients of text messages from same sender from receiving duplicative multiple signature notifications which frees up space to be used for message content.

Enhanced communication between personal devices is achieved in accordance with one aspect of the invention by a system for communication with a data enabled device although lacking mobile phone hardware and software, includes Internet network access capabilities. Such data enabled devices include, but are not limited to, an iPod Touch®, iPad®, portable e-Reader, a personal computer, a portable game player, a game console, a laptop, a television settop receiver, a television set, tablet or a netbook computer. The user of a non-telephony data enabled personal electronic device or a data enabled telephony device (e.g., smartphone, iPhone) is given a registered phone number (or an additional phone number for data enabled telephony devices) which serves to identify the source device in messages originating from the user of service on the data enabled device. The phone number also serves to indicate destination in messages directed to the user of the service on the non-telephony data enabled device. Such messages may originate in mobile telephones of other users, or in similarly equipped and provisioned non-telephony or telephony data enabled devices of other users. A social messaging hub operates such that incoming mobile text messages/multi-media messages are transparently routed, locally or internationally, through existing Short Message Service/Multimedia Messaging Service/Enhanced Messaging Service SMS/MMS/EMS messaging infrastructures including messaging aggregation and delivery organizations, thus messaging bi-directionally between mobile phones and the user's non-telephony data device or smartphone.

Indeed, all subscriber messages are transmitted over the Internet through one or more servers and a message aggregation entity in the messaging infrastructure, so the entire service may be set up as a small third party or outside NUVO, or as similarly small Internet-coupled server operation within an existing mobile carrier (or land-line) network. When offered by an existing mobile carrier to a subscriber with an existing mobile phone, the system enables a user to additionally log onto a web-based service to send and receive SMS/MMS messages with his PC or other data enabled device. Such a web-based service may also operate to send and receive messages identified by a user's land line phone number, even if the user's land line/fixed phone is not SMS/MMS/EMS capable. The social messaging hub may be configured to exchange user messages with common messaging entities, such as Microsoft Windows Live Messenger, AIM, Yahoo, GoogleTalk™, Twitter, Facebook and others, so that texting mobile phones and non-telephony data devices can enjoy substantially similar messaging capabilities. When offered by an existing mobile carrier to a subscriber with an existing mobile phone, the system enables a user to additionally use a secondary phone number simultaneously with his primary phone number to send and receive SMS/MMS/EMS messages with his mobile phone, in essence providing a duality of identifications on a single device.

A data enabled device (also referred to as the Wi-Fi/mobile device) having dual mode Internet network access capabilities operates with software to optimize cost and to efficiently display content or effect communications when traveling internationally away from a home locale or when using a limited data transmission plan. Internal software controls SMS transmission so as to minimize international text messaging charges, and preferably also establishes Internet connection via Wi-Fi connection for accessing content, such as advertising content, appearing on the device's display. For use in a foreign country, the device may be fitted with a SIM card of the foreign country carrier (a local SIM card) and operate as a normal mobile phone to receive local calls, while it is configured to automatically send SMS messages via Wi-Fi, or using data capabilities associated with the data local SIM card when Wi-Fi connectivity is unavailable.

Embodiments of the invention include any type of computerized device, workstation, handheld, tablet or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the social messaging hub can be embodied strictly as a software program, as software and hardware, or as hardware alone such as within a single processor or multiple processors, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION

A social messaging hub combines connectivity to the global SMS infrastructure and IP connectivity to data enabled devices to provide signature control for text messaging, a new service not offered by any other service provider currently. Signature control for SMS text messaging enables a user to control when and how often a user signature is appended to an SMS message. In embodiments described below, a user sets the "signature" (e.g., a character text string defined by the user) to be appended to end of each message in several different ways including, but not limited to:

Once per 24 hours;
Once per a user defined time period
Once per same subject thread;
Once per contact in perpetuity;
With every message sent; and
Never (no signature).

Figure 1:
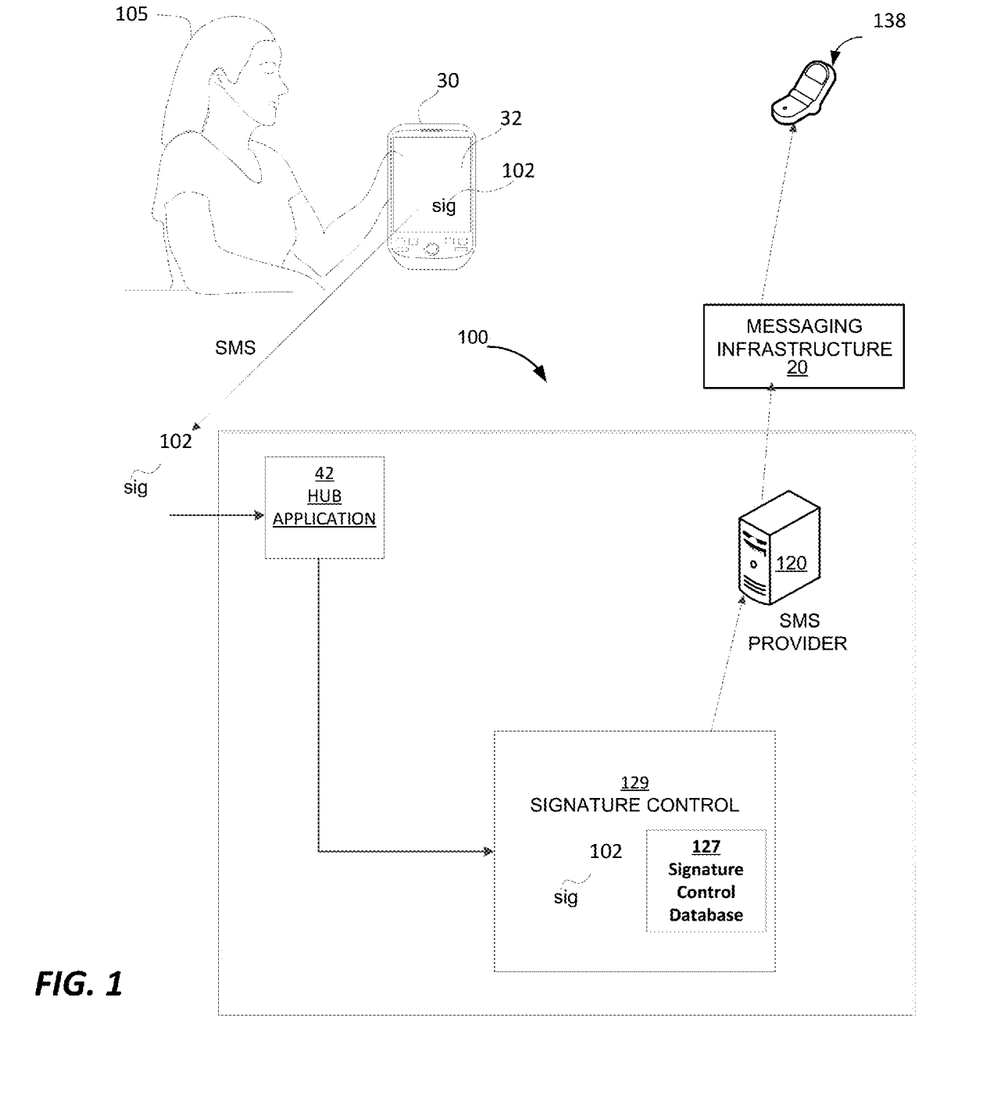
FIG. 1 is a block diagram of a system for signature control on SMS according to embodiments herein.

Referring now to FIG. 1, a block diagram illustrates a general architecture of the system and process. One input to the system is a signature 102 supplied by the sender 105 (i.e., user), typically captured by a mobile device 30 (also referred to as data enabled device 30). The sender composes an SMS message with addressee information and an optional signature 102 which is transmitted to a social messaging hub 100, which can be a remote server or similar device. The social messaging hub 100 includes a hub application 42 operating on a web server 110, a signature control subsystem 129 coupled to the hub application 42, a signature control database 127 coupled to the signature control subsystem 129 and an SMS provider 120 coupled to the signature control subsystem 129 and to a global SMS infrastructure 20.

In one embodiment, user signatures are stored on the Social Messaging Hub and the client. For performance reasons, instead of transmitting what could be large signatures back and forth repeatedly, in some circumstances the copy on the client is simply used in other circumstances the signature on the server (e.g., the social messaging hub) is used. The master version of each signature is kept on the server.

In operation in one embodiment, the user/sender determines that the default signature control mode (e.g., a signature is appended to every message) is not desirable. The user goes to SETTINGS parameters of messaging client UI to alter configuration settings. The user chooses one of several options for signature appendage to messages:

Signature sent with every message (default);
No change;
No signature; and
Signature to be send once per selected time period (e.g., 24 hour period) to each unique recipient.

In one embodiment, the signature control subsystem 129 builds a table in the signature control database 127 to track recipients of messages per sender/subscriber/user. The signature control system determines whether to append the signature a particular message based on the user settings. In one embodiment, the default is to always append a default signature. In another embodiment, alternate signatures (e.g., shorter signatures) can be appended as a function of a message thread or the destination of the message.

Figure 2:
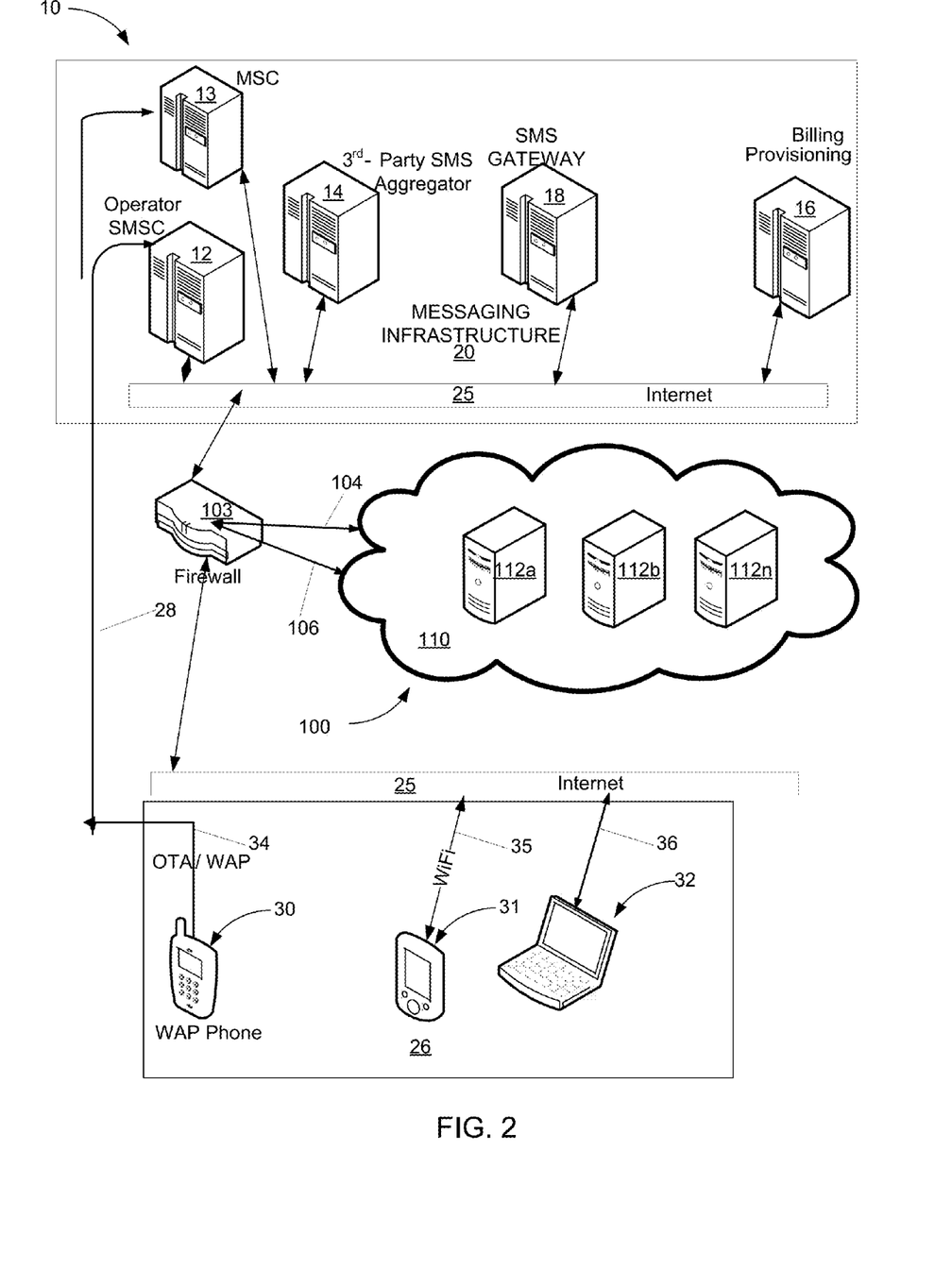
FIG. 2 is a schematic illustration of a social messaging hub and network environment/messaging infrastructure in accordance with one example embodiment disclosed herein.

Now referring to FIG. 2, an exemplary social messaging hub 100 operates in network environment 10 which includes messaging infrastructure 20. The social messaging hub 100 includes one or more processors 112a-112n and is coupled to the network environment 10 and messaging infrastructure 20 through a firewall 103. The firewall 103 is typically located at a social messaging hub 100 hosting facility.

The messaging infrastructure 20 includes, but is not limited to, a Short Message Service Center (SMSC) 12, a third party SMS aggregator 14 (also referred to a SMS aggregator 14), a billing and provisioning system 16, an SMS Gateway (SMS-GW) 18, social messaging gateways 22 and a cellular phone infrastructure 28. Other components of the messaging infrastructure 20 include a Mobile Switching Centre (MSC) 13 and additional SMS-Gateways and other SMSCs and billing and provisioning systems provided by additional mobile carrier service providers (not shown). The SMSC 12 and the billing and provisioning system 16 are typically operated by a mobile carrier service provider. The MSC 13 is also typically operated by a mobile carrier service provider. The social messaging gateways 22 include connections to IM services, for example AOL instant messenger (AIM), Yahoo Messenger, Windows Live Messenger Jabber, Skype, Tencent QQ, ICQ and GoogleTalk (gTalk), and other social networks such as Facebook and Twitter.

In one embodiment, the social messaging hub 100 communicates with the systems in the messaging infrastructure 20 (e.g., SMSC 12, the third party SMS aggregator 14 and the billing and provisioning system 16) using various network protocols including the Short Message Peer-to-Peer (SMPP) protocol, Signaling Transport (SIGTRAN) protocol or SS7 protocol. The SMPP protocol is a telecommunications industry protocol for exchanging SMS messages between SMS peer entities.

In this embodiment, the link between the social messaging hub 100 and the messaging infrastructure 20 is secured by the firewall 103 using, for example, a virtual private network (VPN) connection with HTTPS using 1024 bit (3DES-SHA1) encryption. Messages are transferred over SMPP link 104 and provisioning and single sign on (SSO), XML and SOAP messages and other control traffic are interchanged over control link 106. In another embodiment, messages are transferred over SIGTRAN (SS7 over IP) depending on the connection (e.g., a connection to a European Mobile Operator).

The social messaging hub 100 is connected via the Internet 25 or a dedicated connection to the messaging infrastructure 20 that relays messages between existing customer equipment, for example, a mobile phone 29, a data enabled mobile phone 30, a data enabled WiFi phone 31 and other data enabled devices (not shown) such as a laptop, netbook, tablet and a smart phone. The mobile phone 29 can be connected to the social messaging hub 100 over the cellular phone infrastructure 28 through the SMSC 12 using an SMS protocol. The MSC 13 is also connected to the cellular phone infrastructure 28. The data enabled mobile phone 30 can be connected to the social messaging hub 100 over the cellular phone infrastructure 28 using a data connection provided by OTA/WAP protocols. A data enabled WiFi phone 31 can be connected to the social messaging hub 100 via a WiFi connection to the Internet. It is understood that a mobile phone can be data enabled via both a WAP connection and a WiFi connection. The data enabled WiFi phone 31 is sometimes referred to as a dual mode phone if it can also connect over WAP. As referred to herein, a "non-telephony" device is a data enabled device which does not incorporate mobile phone hardware and software and which sends and receives SMS messages over an IP channel in contrast to mobile phone 29 which sends and receives SMS messages over standard cellular phone control channel.

A laptop personal computer 32 can be connected to the social messaging hub 100 via a wired Internet 25 connection 36 or a wireless Internet connection (not shown). Other mobile/portable data enabled devices (not shown) include but are not limited to a portable media players, personal digital assistants, Wi-Fi mobile platforms, pad-tablet computers, portable e-Readers, personal computers, portable game players, game consoles and netbook computers which can be connected to the social messaging hub 100 via the Internet 25 using a WiFi, wired or other wireless connection. These devices, the data enabled mobile phone 30 and the data enabled WiFi phone 31 are collectively referred to as a data enabled device 26 or devices 26 and these devices generally establish an Internet protocol (IP) session or connection with the social messaging hub 100. Some data enabled devices 26 interface with the social messaging hub 100 using a client browser 37 and other data enabled devices 26 interface with the social messaging hub 100 using a client software component (also referred to as a client application or simply "app"). The client browser 37 communication to a corresponding web application and the client application (app) are collectively referred to as application 40. In one embodiment the application 40 (also referred to as a social messaging application or App) is a HeyWire App an application supplied by MediaFriends Inc. and referred to as HeyWire App 40 or simply HeyWire.

In operation and as described below in more detail, the social messaging hub 100 obtains a plurality of unique identifiers which in one embodiment, are telephone numbers acquired through or serviced by a competitive local exchange carrier (CLEC), local exchange carrier (LEC) or other provider that is authorized to issue or service registered phone numbers, and the set of numbers so issued may be serviced by that carrier's network, another carrier network or by a separate entity or sub-entity such as a network unaffiliated virtual operator (NUVO), that serves as the service provider to users and functions as a destination carrier to receive messages directed to its telephone numbers from the SMS aggregator 14, an SMS operator (e.g., a mobile carrier), a content provider or another NUVO, and to provide an Internet interface for delivery of the messages to users' data enabled devices 26.

The social messaging hub 100 assigns a user of a data enabled device 26 a unique identifier from the plurality of unique identifiers and the social messaging hub 100 associates the unique identifier with a data enabled device identifier. The data enabled device identifier includes but is not limited to a network address, a Unique Device Identifier (UDID), a Media Access Control address (MAC address), a International Mobile Equipment Identity (IMEI), a Mobile Equipment Identifier (MEID), a Electronic Serial Number (ESN) and a CPU serial number, of the data enabled device 26. The social messaging hub 100 registers the association between the unique identifier with a data enabled device identifier in a database. After the user is assigned a unique identifier, a userid and password is when the application 40 is started. When the user registers the enabled device 26 and signs-in to an IM service or social media account (e.g., AIM, Yahoo Messenger, Windows Live Messenger and GoogleTalk, Facebook, Twitter, etc.) the account information is stored, in certain embodiments, on the user's data enabled device in a mini database for app. Previously stored login/signon information can be retrieved in order to sign on the user automatically.

In one embodiment, the user is given a registered phone number and unique IP addressable identification. The IP addressable identification is a connectionless method by which the user supplied email address, supplied as part of the registration process for contact purposes, is combined with the unique registered phone number. By affecting such a combination of two unique identifiers, each supplied by separate parties, a unique identification is created that can be located in a connectionless manner on the Internet.

For inbound messages (i.e., sent to the data enabled device 26), the social messaging hub 100 receives the text message from the messaging infrastructure 20 (e.g., message service SMSC 12, or SMS aggregator 14). The message is directed to the user's data enabled device 26 having the registered unique identifier obtained from the text message source, and the social messaging hub 100 provides the message to an inbound service, establishes a connection between a data enabled device 26 and the inbound service and pushes the text message from the inbound service to an application or web browser running on the data enabled device 26.

For outbound messages (i.e., sent from the data enabled device 26), the social messaging hub 100 receives the text message from the data enabled device 26 including a destination identifier for the message, processing the message and provide the message to SMS destination through the messaging infrastructure 20 (e.g., SMSC 12, or SMS aggregator 14) for delivery to the message recipient.

The social messaging hub 100 can submit multiple messages in one transmission using a 1 to many feature in conjunction with the application 40 (i.e., web client or smart phone app). The social messaging hub 100 transfers messages between data enabled devices 26 without the use of the message infrastructure 20 even if phone numbers are used as the addresses. Provisioning and SSO are incorporated in the social messaging hub 100 such that once a registered phone number and other user information is stored in database 126 connections and logins can be established automatically.

As described below in conjunction with FIGS. 3-5, the social messaging hub 100 may be configured to provide signature control using SMS/MMS-capable mobile phones and smart phones, and operates such that message bandwidth can be more efficiently used as messages are routed, locally or internationally, through existing SMS/MMS delivery organizations in the messaging infrastructure without redundant signatures.

More generally, embodiments of the social messaging hub 100 include an application which enables a user (sometimes referred to herein as a subscriber) to perform SMS/MMS/EMS messaging activities with appended signatures using a data enabled device 26, such as an iPod Touch, iPad, portable e-Reader, a personal computer, a portable game player, a game console, a laptop, a television set or a netbook computer, all of which can connect to the Internet. Messaging is carried out bi-directionally between the data enabled device 26 (non-telephony device, smartphone or other data devices) and other SMS capable devices. The social messaging hub 100 is implemented without any add-ons, that is, without requiring the user to attach accessory electronic devices, and is implemented via a the social messaging hub 100 that maintains an Internet connected server that interfaces with certain wireless messaging facilities in the messaging infrastructure 20 to establish device-to-wireless communications. In different embodiments, the social messaging hub 100 may be a separate dedicated entity, or may be a service entity set up within a mobile service provider to service data enabled devices 26 of some of the provider's subscribers. Further, the social messaging hub 100 may provide applications for managing the address books, messages and account information of the user.

When the social messaging hub 100 is a separate message service center entity, the social messaging hub 100 operations may be incorporated by one or more mobile providers to extend their subscriber service capabilities and the provider entity may provide dedicated connections for affecting coordination between services, call logs and billing for the affected accounts.

Features of the social messaging hub 100 may be provided within, or as external hosting services communicating with an existing mobile network provider as a web based application using advanced web capabilities, and may be configured to handle all forms of messaging for the subscribers. Subscription/Unsubscription operations can be performed from a web client running on any data enabled device 26 that supports standard Internet browsers or from IP based applications.

Figure 3:
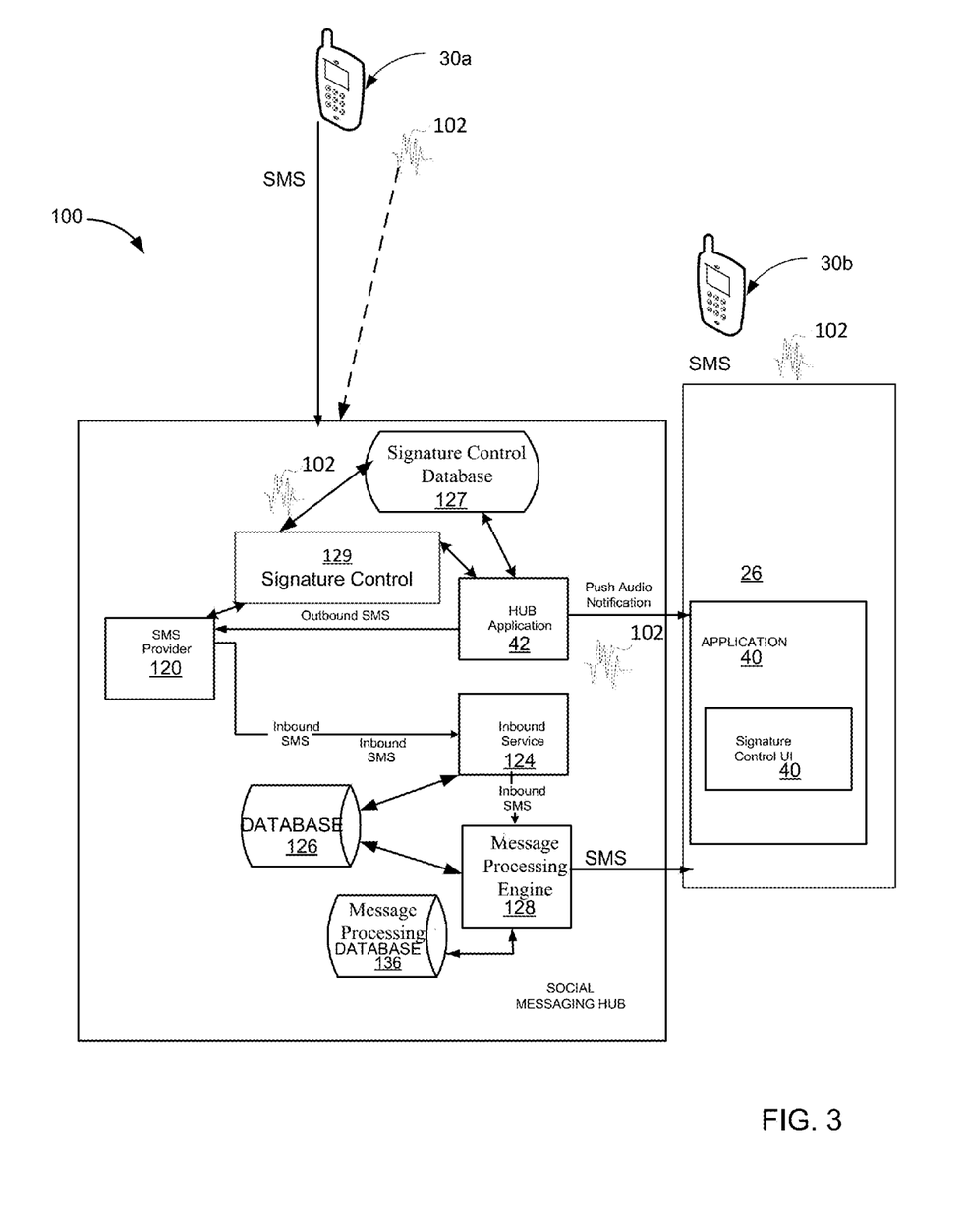
FIG. 3 is a schematic illustration of the social messaging hub of FIG. 1 including an embodiment of a system configured for signature control.

FIG. 3 illustrates the architecture of one embodiment of the social messaging hub 100 for multiple messaging applications. The social messaging hub 100 includes an SMS provider 120 which provides the interface to the messaging infrastructure 20 and in particular in one embodiment to the SMSC 12, SMS aggregator 14 and (SMS-GW) 18. The SMS provider 120 is used to send and receive SMS/MMS/EMS messages respectively to and from: a mobile phone 29 through the cellular phone infrastructure 28 and a data enable device 26 shown here as laptop personal computer 32 and a smart phone 50. The social messaging hub 100 further includes a signature control subsystem 129 which is coupled to a signature control database 127, the SMS provider 120 and the hub application 42.

The SMS provider 120 is interfaced to a web farm 150 having one or more servers 152a-152n (collectively referred to as web server 152). The servers 152a-152n store the SMS/MMS/EMS messages received and SMS/MMS/EMS messages to be delivered in conjunction with database server 125 and database 126. The servers 152a-152n also support a Hub application 42 which runs in conjunction an application 40 on data enabled device 26, here laptop 32 or smart phone 50. The web farm 150 is coupled to a database server 125 and corresponding database 126 which is used to store user information including the association between the assigned unique identifiers and data enabled device identifiers.

The social messaging hub 100 further includes a common message conversation queue which is interfaced to the database 126 and the message processing engine 128.

The database server 125 is connected to a message processing engine 128 which has an associated message processing database 136. Database server 125 in conjunction with database 126 primarily stores SMS messages and certain user information and it is used when interfacing to the messaging infrastructure 20. The components of the social messaging hub 100, in one embodiment, are developed in C, C++, JAVA® or other suitable programming language, and include web servers, such as Apache, Microsoft Internet Information Services platform (IIS) or other suitable server systems operating on a UNIX, Microsoft or other operating system platform to store and communicate messages to Internet devices. An exemplary software framework for the social messaging hub 100 includes the following:

The Hub application 42 on servers 152a-152n runs on a .Net framework and is hosted on a Microsoft IIS7 system on a windows 2008 server. The database 126 is a relational database implemented in this embodiment using Microsoft SQL Server, and the message processing engine 128 is implemented as a COMET server, using a COMET engine (using .net framework). The SMS provider 120 is a C++ server application which interacts with the messaging infrastructure 20.

Implementations for specific social messaging entities and devices are schematically illustrated in FIG. 3 which, for purposes of discussion, reference the above-described software and other communications elements. It is understood, however, that the servers, interfaces and other hardware and software elements of each system may vary within a broad range, so long as the system is well integrated with its operative components and is configured to communicate effectively with the other messaging entities involved.

In operation in one embodiment, a user selects the desired signature options. The signature and signature control preferences are received from the user/subscriber's data enabled device and stored in the signature control database 127 as well as the data enabled device. The signature control subsystem 129 determines whether the signature 102 stored in the signature control database 127 should be appended to the outgoing SMS message for delivery to a message recipient indicated by the SMS destination identifier. The determination is based on the user preferences and the history of SMS messages sent to a particular destination identifier.

For example, when the user selects the once per day per recipient option, the signature control subsystem 129 sets a 'no signature' flag for each recipient/sender pair after the first instance of message with an appended signature. The no signature flag is reset after twenty-four hours or if the user/sender changes the signature preference options. During the twenty-four hour period the "no signature" flag is set, signatures are not appended to subsequent additional messages. It is understood that various interval settings other than twenty-four hours can be used and also additional criteria can be used to determine whether signatures are appended.

The social messaging hub 100 consolidates message delivery into a common message conversation queue 130 and intermixes messages from other messaging services, including presence activity and geographic location data into the common message conversation queue 130. This consolidation, allows the social messaging hub 100 to enable personal replies to be threaded back to the user's social inbox so individual chat conversations can continue across multiple data enabled devices to provide multi-screen messaging.

When used to support multiple mobile network providers, advantageously, the social messaging hub 100 is configurable for each provider. It is understood that the various server functions of the social messaging hub 100 could be run on a single computer or multiple computers, storage could be provided by individual storage media or a storage area network.

Figure 4:
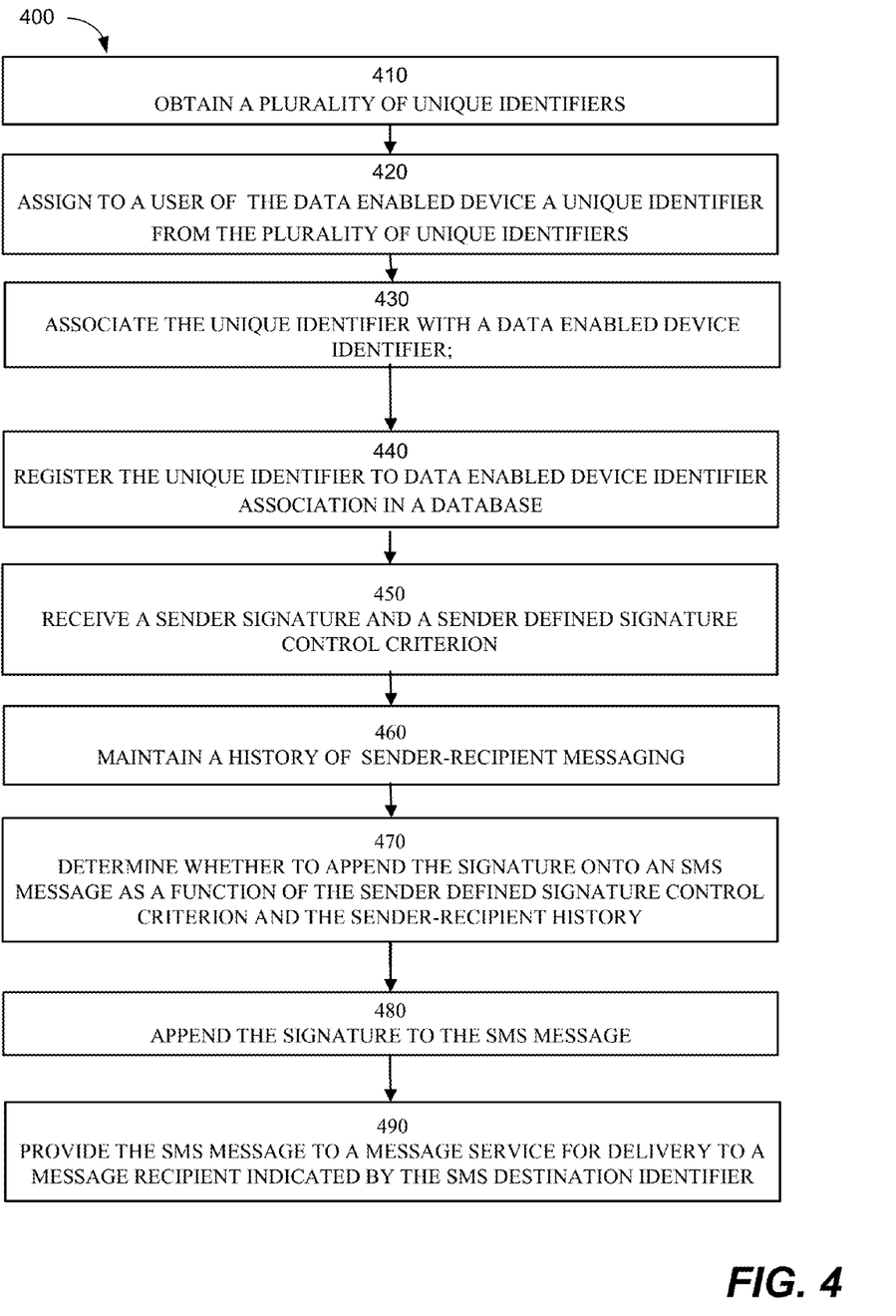
FIG. 4 is a flow chart of processing steps performed to register data enabled devices and to control signatures appended to text messages from these devices to mobile phones through a messaging infrastructure in accordance with embodiments disclosed herein.

In FIG. 4, flowchart 400 diagrams the overall process of appending signatures to text messages facilitated by the social messaging hub 100. In step 410 the social messaging hub 100, obtains a plurality of unique identifiers. In step 420, a user of the data enabled device 26 is assigned a unique identifier from the plurality of unique identifiers. In step 430, the unique identifier is associated with a data enabled device identifier, and in step 440, the unique identifier to data enabled device identifier association is registered in the database 126.

In step 450, a signature is received from the data enabled device and in one embodiment is stored in the signature control database 127. A sender defined signature control criterion is also received from the data enabled device and in one embodiment is stored in the signature control database 127. In step 460, a history of sender-recipient messaging is maintained. In step 470 it is determined whether to append the signature onto an SMS message as a function of the sender defined signature control criterion and the sender-recipient and thread history. In step 480, the signature is appended to the SMS message if the determination is made in step 470, and finally in step 490, the SMS message is provided to a message service in the messaging infrastructure 20 for delivery to a message recipient indicated by the SMS destination identifier.

Figure 5A:
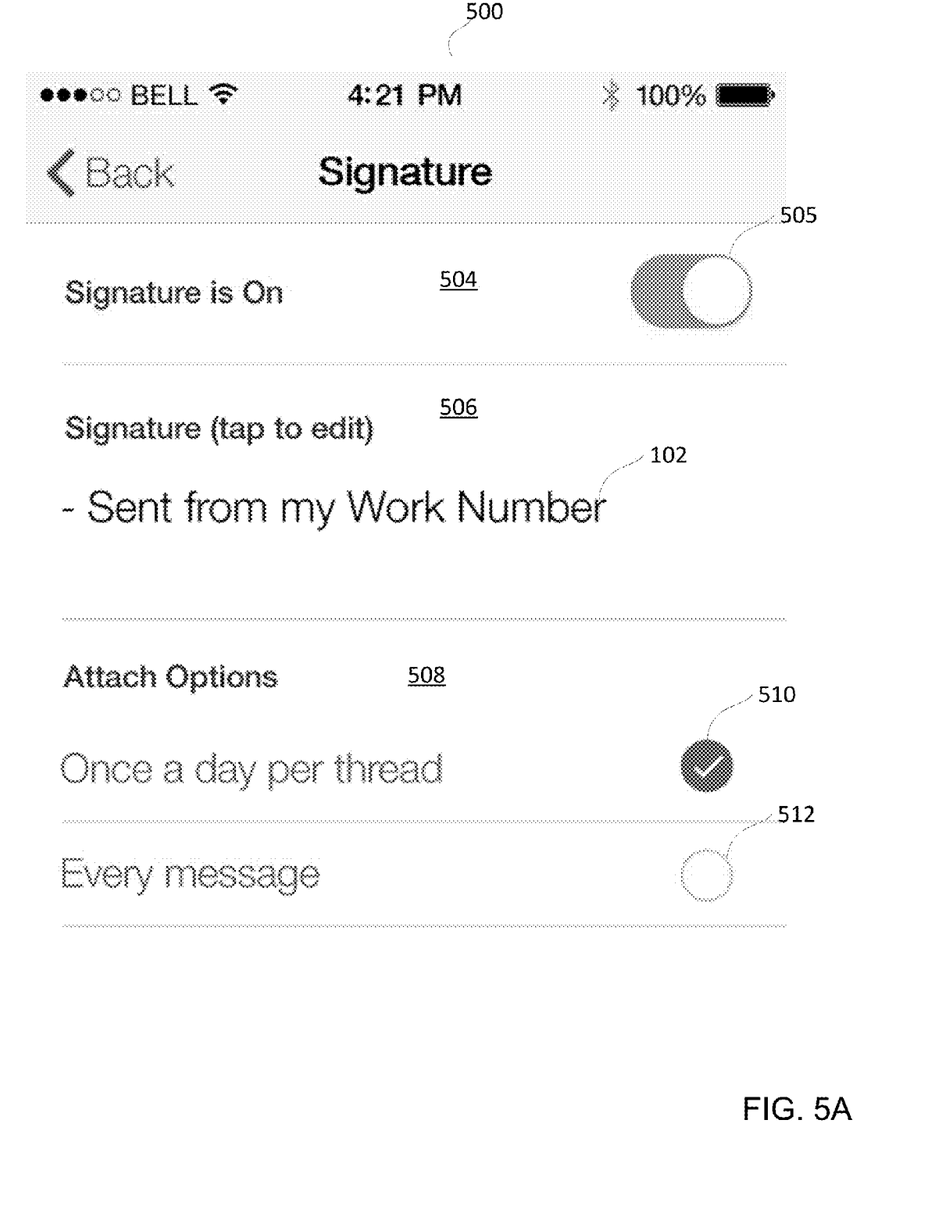
FIGS. 5A-5C show screen shots of a user interface involved in a process of setting user signature control preferences in accordance with one example embodiment disclosed herein.

Now referring to FIGS. 5A-5C, user interface screens 500-502 allow the user to specify if and when a signature is to be appended onto the text message. In FIG. 5A Screen 500 shows a signature status box 504, here indicating the signature is on as indicated by illuminated icon 505 and the signature will be appended if additional criteria is satisfied, for example, whether the message is part of: a group thread, the message is an intra company message, an inter company message, an international message and a domestic message. Screen 500 also includes a display of the current signature 102 in the signature box 506. The screen 500 also includes a attach options box 508 with a button 510, which when pressed selects the Once a day per thread and button 512, which when pressed selects Every Message.

In one embodiment, the message threads are stored/tracked in the database 126 and acted upon by the message processing engine 128. As part of the database storage of each message, flags are set with each message to be associated with a particular thread similar to using a uniquely generated random thread identifier and assigned to every message associated with that thread.

It is understood that there are other situations in which signature control can be applied, including but not limited to, messages sent during a user defined time period; messages in the same or similar subject thread; messages to a particular contact (for example no signatures in perpetuity to the contact); messages to international destinations and messages addressed to Intra Company threads.

Figure 5B:
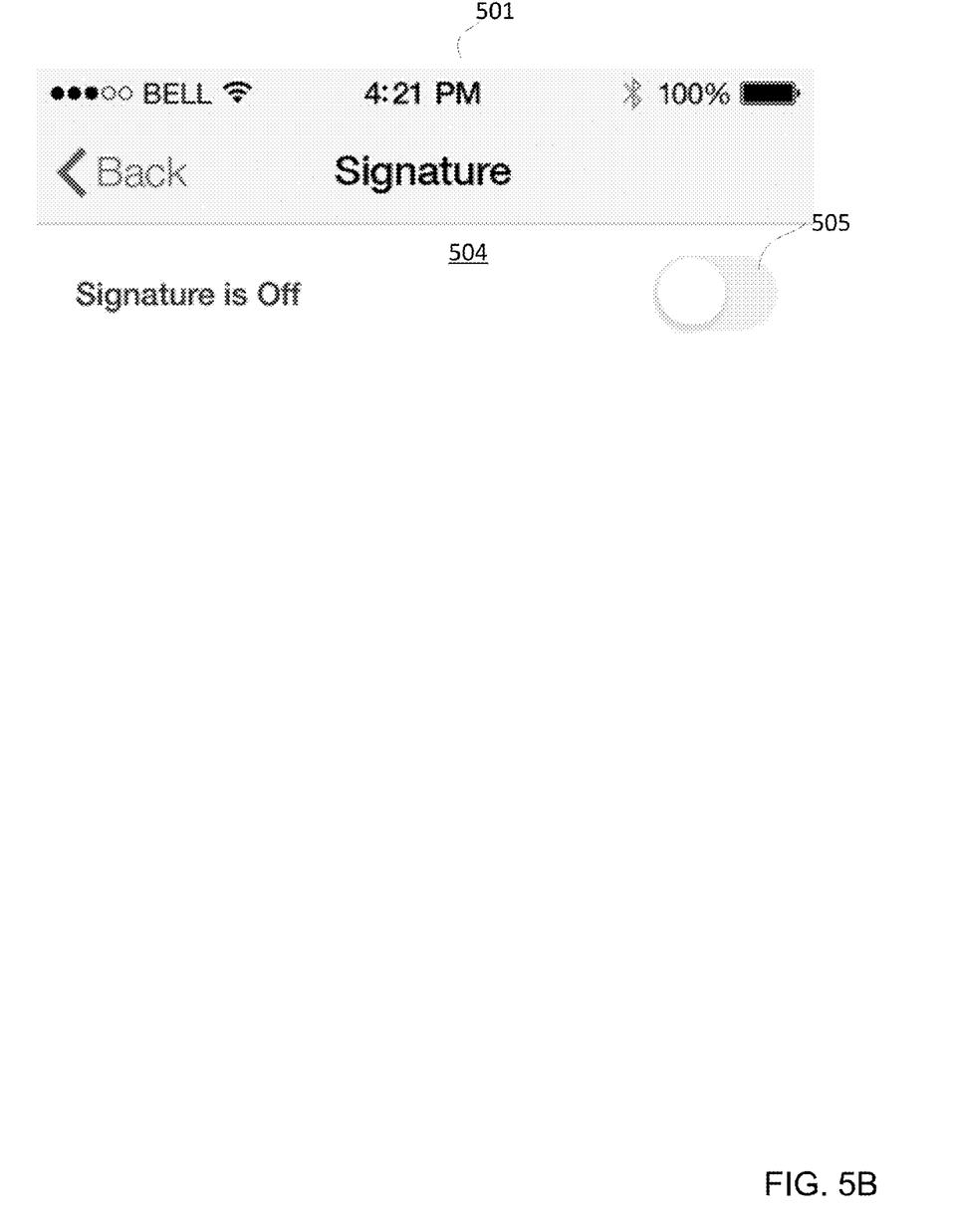
Figure 5C:
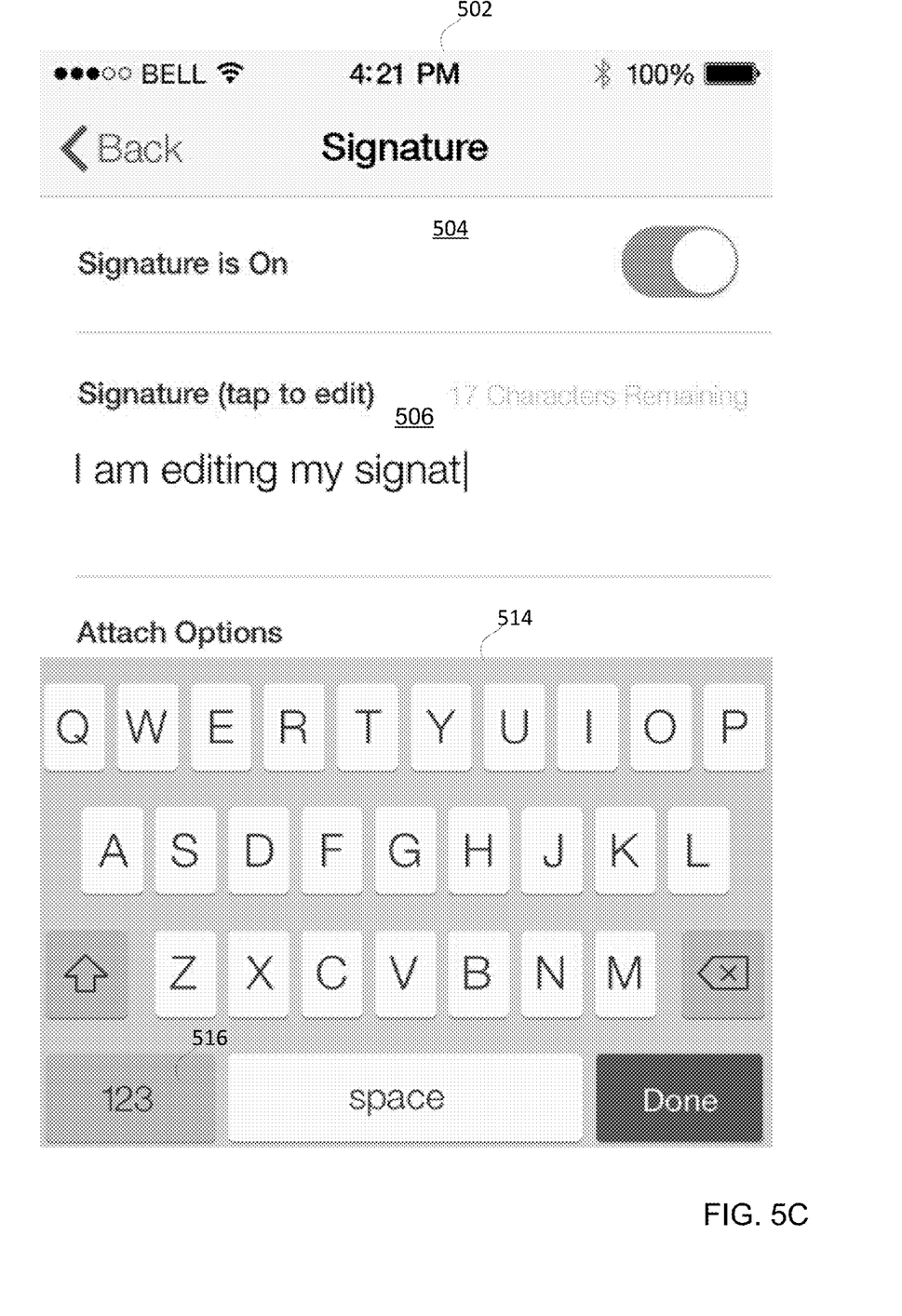

In FIG. 5B, screen 501 shows signature status box 504 and here signatures are disabled as indicated by un-illuminated icon 505 and the signature will not be appended. In FIG. 5C, screen 502 includes an alphabetic keyboard 514 and numeric keyboard selector 516 which enable the user to edit a signature box 506.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A method for controlling signatures appended to Short Message Service/Multimedia Messaging Service/Enhanced Messaging Service (SMS/MMS/EMS) communications comprising:
   assigning to a user of a data enabled device a unique identifier;
   associating the unique identifier with a data enabled device identifier;
   registering the unique identifier to data enabled device identifier association in a database;
   receiving a sender signature;
   receiving a sender defined signature control criterion including an interval for appending the signature onto the SMS message;
   maintaining a sender-recipient history;
   determining whether to append the signature onto an SMS message as a function of the sender defined signature control criterion and the sender-recipient history; and
   providing the SMS message to a message service for delivery to a message recipient indicated by an SMS destination identifier.

2. The method of claim 1, wherein the sender defined signature control criterion further specifies that the criterion is to be applied to a message thread.

3. The method of claim 1, wherein the determination whether to append the signature is made remotely from the data enabled device.

4. The method of claim 3, wherein the signature is stored remote from the data enabled device.

5. The method of claim 4, wherein the signature is stored on a social media hub.

6. The method of claim 4, wherein the signature is stored in a cloud storage system.

7. The method of claim 1, wherein the sender defined signature control criterion interval comprises a default interval.

* * * * *